(12) United States Patent
Benini et al.

(10) Patent No.: US 7,068,662 B2
(45) Date of Patent: Jun. 27, 2006

(54) ESTABLISHING A BROADBAND CONNECTION THAT SAVES RESOURCES AND SATISFIES BILLING CONDITIONS

(75) Inventors: Giovanni Benini, Watertown, MA (US); Jeanette Herzinger, München (DE); Andreas Kalkbrenner, München (DE); Rainer Stademann, Berg (DE); Rudolf Stelzl, Dachau (DE); Johann Zeiner, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/748,578

(22) Filed: Dec. 30, 2003

(65) Prior Publication Data

US 2004/0218740 A1    Nov. 4, 2004

Related U.S. Application Data

(63) Continuation of application No. PCT/DE02/01923, filed on May 24, 2002.

(30) Foreign Application Priority Data

Jul. 2, 2001    (DE) ................ 101 31 959

(51) Int. Cl.
*H04L 12/28*    (2006.01)
*H04L 12/56*    (2006.01)
*H04M 15/00*    (2006.01)

(52) U.S. Cl. .................. 370/395.42; 370/395.41; 370/395.43; 370/395.2; 370/468; 379/114.05; 379/114.06; 379/114.07

(58) Field of Classification Search ............. 370/395.2, 370/395.21, 395.4, 935.41, 395.42, 395.43, 370/412, 413, 468; 379/114.01, 114.05, 379/114.06, 114.07, 120; 455/452.1, 452.2
See application file for complete search history.

(56) References Cited

U.S. PATENT DOCUMENTS 3,766,324 A    10/1973 Budrys et al.
5,258,979 A *  11/1993 Oomuro et al. ............. 370/232

(Continued)

FOREIGN PATENT DOCUMENTS

DE    32 10 674 A1    10/1983

(Continued)

OTHER PUBLICATIONS

Morris D et al, "Charging for ATM Services", IEEE Communications Magazine, IEEE Servcie Center, Piscataway, NJ, US, vol. 37, No. 5, May 1999, pp. 133-139, XP000830892.

(Continued)

*Primary Examiner*—Quoc Tran

(57)    ABSTRACT

The invention relates to a communications system and a method for establishing a broadband connection, for example a multi-media connection between two or more users, by means of exchanges in a communications network, for example an ATM network. According to the invention, when the exchanges receive a request from a calling user to establish a broadband connection, said exchanges first establish a minimal connection between the users and once the minimal connection is in operation between the users, the requested broadband connection is established. The users of broadband network capacities, which have been reserved by the network at the request of the user, are billed during the call phase. Broadband connections of this type can receive a higher priority than the upgrade of minimal connections to complete connections. A voice connection comprising audio data constitutes for example a minimal connection. The broadband connection takes place for example between video telephones.

17 Claims, 2 Drawing Sheets

U.S. PATENT DOCUMENTS

| | | |
|---|---|---|
| 5,440,554 A | 8/1995 | Stannard et al. |
| 6,014,556 A * | 1/2000 | Bhatia et al. ............. 455/404.1 |
| 6,243,450 B1 * | 6/2001 | Jansen et al. .......... 379/144.01 |
| 6,298,059 B1 * | 10/2001 | St-Amand et al. ........... 370/397 |
| 6,338,046 B1 * | 1/2002 | Saari et al. .................... 705/34 |
| 6,347,224 B1 * | 2/2002 | Smyth et al. ............... 455/406 |
| 6,396,816 B1 * | 5/2002 | Astle et al. ................. 370/264 |
| 6,741,685 B1 * | 5/2004 | Zanaty .................. 379/114.01 |
| 6,765,913 B1 * | 7/2004 | Lowe et al. ........... 370/395.21 |
| 6,775,267 B1 * | 8/2004 | Kung et al. ................. 370/352 |
| 6,816,458 B1 * | 11/2004 | Kroon ........................ 370/235 |
| 2002/0080816 A1 * | 6/2002 | Spinar et al. ............... 370/449 |
| 2002/0114305 A1 * | 8/2002 | Oyama et al. .............. 370/338 |

FOREIGN PATENT DOCUMENTS

| | | |
|---|---|---|
| EP | 0 583 094 A | 2/1994 |
| EP | 0 763 939 A | 3/1997 |
| WO | WO 02/052832 | 7/2002 |

OTHER PUBLICATIONS

Donal Morris, Versus Pronk; "Charging for ATM Services": IEEE Communications Magazine; IEEE Service Center; Piscataway, NJ, US; vol. 37. No. 5; May 1999 (1999-05); pp. 133-139; XP000830892.

* cited by examiner

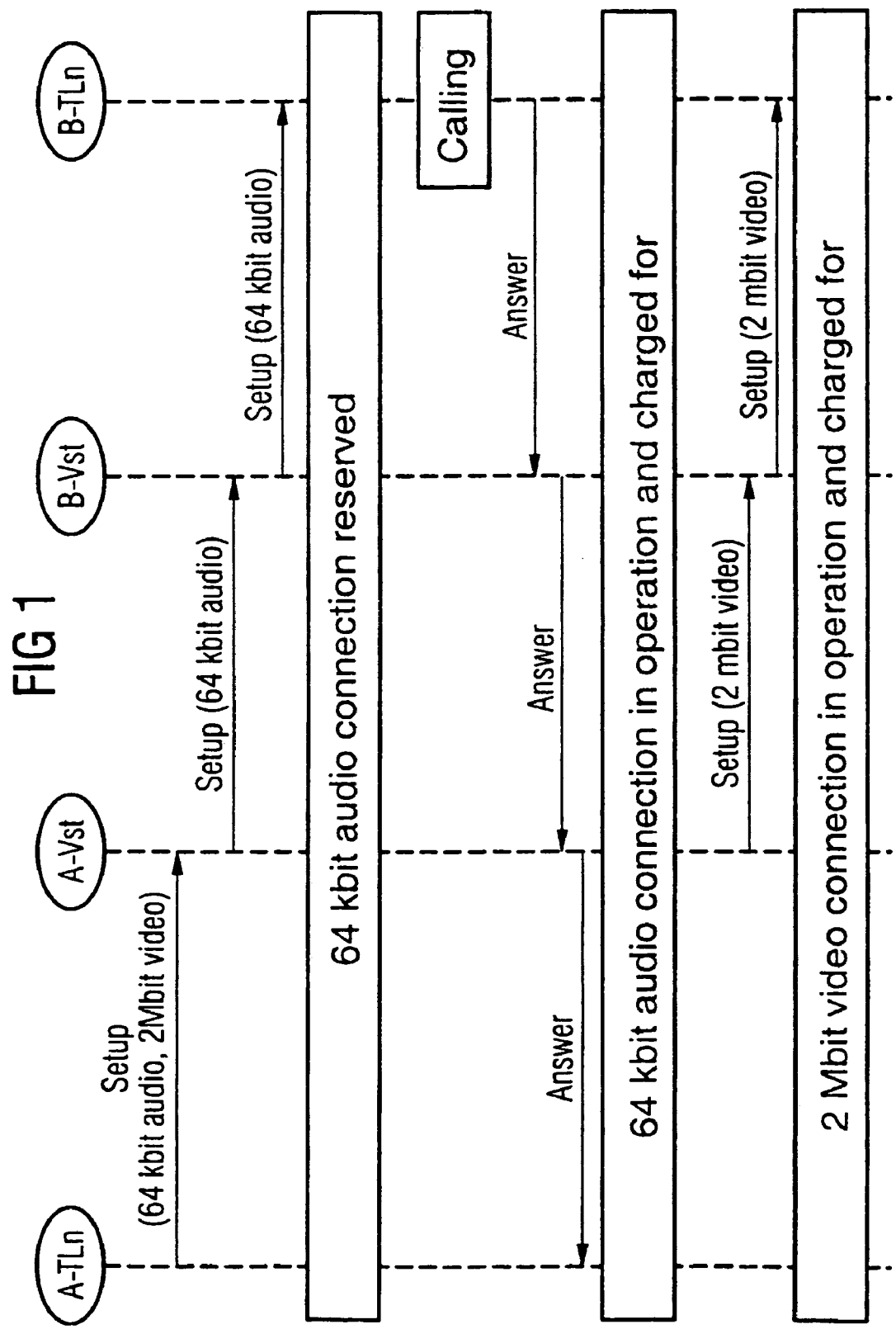

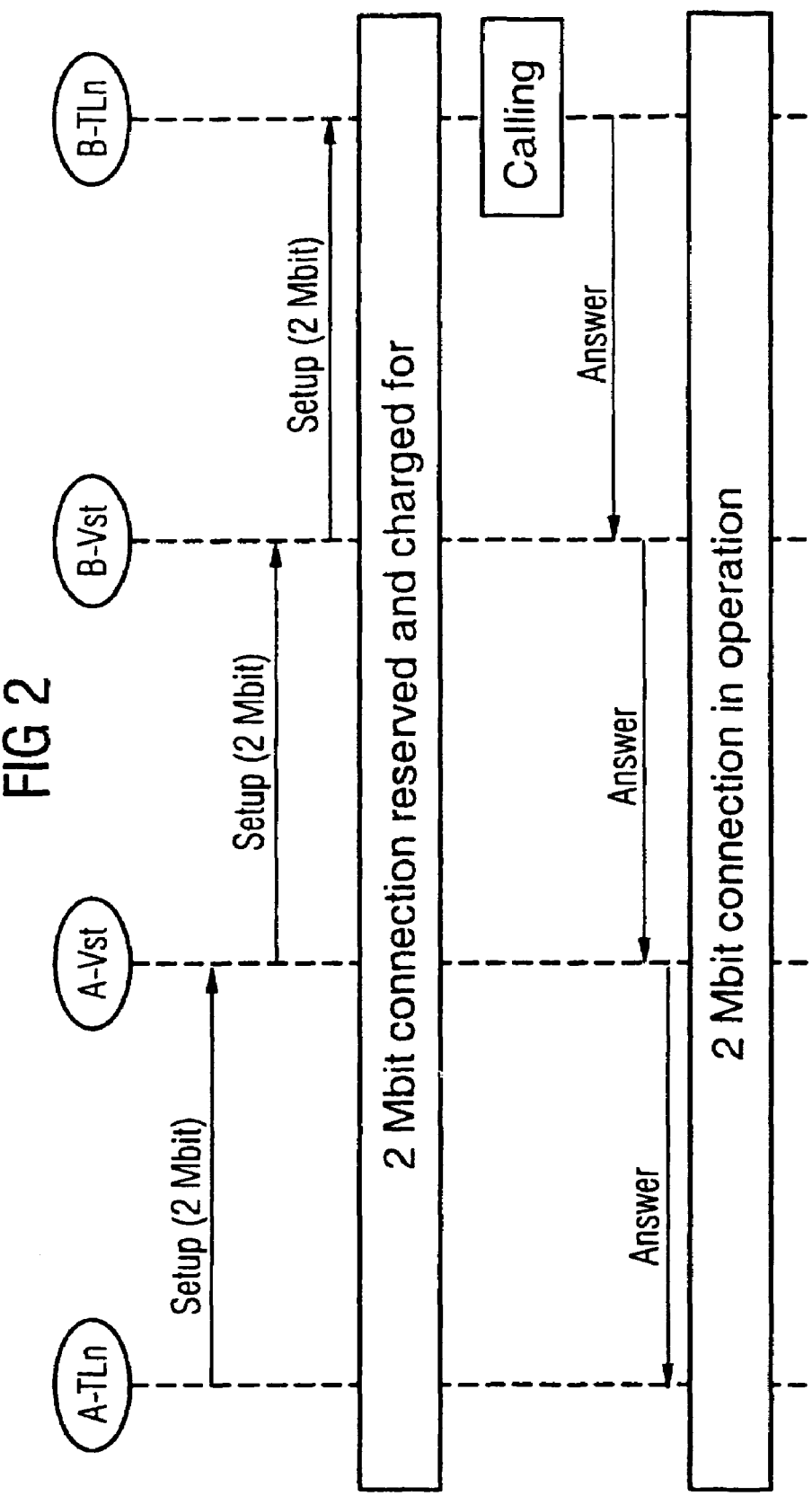

ESTABLISHING A BROADBAND CONNECTION THAT SAVES RESOURCES AND SATISFIES BILLING CONDITIONS

CROSS REFERENCE TO RELATED APPLICATIONS

This application is a continuation of International Application No. PCT/DE02/01923, filed May 24, 2002 and claims the benefit thereof. The International Application claims the benefits of German application No. 10131959.2, filed Jul. 2, 2001, both applications are incorporated by reference herein in their entirety.

FIELD OF INVENTION

The present invention relates to a communication system and a method for establishing a multimedia connection between two or more subscribers by means of switches in a communication network and a method for charging for a broadband connection.

BACKGROUND OF INVENTION

Unlike private networks such as PBXs, public telephone networks operate on a connection-oriented basis. Before the actual data exchange between the subscribers, connection setup takes place in which the path through the network is specified and the required resources such as circuits, channels and bandwidths for these connections are reserved. The path through a communication network is specified within the switching system on the basis of the address supplied at connection setup and stored traffic routing data. At connection setup, the most favorable path for the connection through the network from the A-subscriber to the B-subscriber is determined according to pre-defined algorithms. After connection setup, the B-subscriber is called. The required or agreed bandwidth is possibly monitored during the connection to prevent overloads in the switches involved and in order not to appreciably limit the quality of the other connections.

Analogously to the reserving of channels and circuits in connection-oriented communication networks such as ATM networks (Asynchronous Transfer Mode), in connectionless networks such as IP networks (Internet Protocol) transmission and routing capacity is reserved for the required connection. This is necessary in such networks in order to be able to guarantee a specified QoS (Quality of Service) for the communication.

Multimedia services such as videophone and videoconference require broadband connections with bit rates of 1.5 Mbit/s to 100 Mbit/s or more. Connections of this kind generally contain a plurality of user data streams. Thus an audio and a video data stream are generally required for videotelephony, as the audio and video data are compressed using different compression methods with different compression rates, the video data stream requiring a higher bandwidth than the audio data stream despite compression.

If multimedia connections of this kind are established according to the procedure outlined above, which is described in Kalmanek, C. R.; DOSA: An Architecture for Providing a Robust IP Telephony Service, AT&T Labs, New Jersey, for Internet telephony, network resources are wasted, as the full bandwidth is reserved in the network or the broadband connection is already in place during calling of the B-subscriber (ringing of the videophone at the receive end). The network operator receives no revenue for this service, as charges are not payable until the B-subscriber accepts the call and the connection is put into operation. Likewise the case may arise that resources requested by the A-subscriber for setting up the broadband connection are not available to the network, the connection is not therefore established and the B-subscriber is not even called in the first place. This means lost revenue for the network operator and increasing customer dissatisfaction.

One approach for solving the problem is known from Sinnreich, H.; Interdomain IP Communications with QoS, Authorization and Usage Reporting, Internet Draft, Draft-sinnreich-interdomain-sip-qos-01.txt, 2000, in which the B-subscriber is called even though the connection is not yet stable in the network or the resources requested by the A-subscriber are not yet available.

However, it may happen that, when the B-subscriber goes off-hook, the connection is set up with a delay, with poor or not the desired quality, or not at all. In addition, ITU-T Recommendation Q.2962 of the International Telecommunication Union—Telecommunication Standardization Sector describes broadband ISDN signaling protocols that allow an A-subscriber to initiate the conversion of a minimum connection to a broader-band connection. According to this approach, the A-subscriber already possesses a minimum connection when he initiates the conversion. However, the A-subscriber cannot be prevented from requesting a broadband connection from the very outset, which means that the original situation with the associated problems described above can therefore arise. According to ITU-T Recommendation Q.2962, the A-subscriber can specify, to the network or his switch, one or more alternatives for establishing the connection. Thus, if the resources are available, a broadband connection is established. However, if network resources are again reserved during calling of the B-subscriber, and if no resources are available for a broadband connection, only a minimum connection is established which is not subsequently converted to a broadband connection.

SUMMARY OF INVENTION

The object of the invention is to create a communication system or a method for establishing a multimedia/broadband connection between subscribers in a communication network as well as a method for charging for a broadband connection which will enable a multimedia/broadband connection to be established in a resource-saving manner with appropriate call charging.

This object is achieved by the features of the independent claims. A broadband connection between subscribers is therefore only established by the network after a minimum connection has been set up between the subscribers and said minimum connection has been put into operation by said subscribers. As a minimum connection is first set up and reserved, this ensures that if, for example, the called party is absent during the calling phase (ringing of the videophone at the receive end), no network resources for reserving a broadband connection are wasted. Nevertheless, a reliable, quickly established and fully adequate connection, the minimum connection, is available to the subscribers. This prevents the situation arising that no connection exists when the B-subscriber goes off-hook or the established connection is of poor quality. The subscribers can determine, via the minimum connection, what data is to be transmitted. This can include, for example, audio data for a voice connection or initialization data to receive-end playback or recording equipment whose data is then transmitted via the broadband connection. The minimum connection can be automatically converted to a broadband connection or an additional broadband connection can be automatically set up by the network or even initiated by the subscribers themselves. However, as the communication network or the switches control the multi-stage connection setup, establishment of a broadband connection without the prior setup and putting into operation of a minimum connection is prevented.

If an A-subscriber wishes to establish a broadband connection to a B-subscriber, e.g. without first establishing a minimum connection, the A-subscriber will be charged for broadband network capacities, which are reserved in the network at his request, as early as the calling phase (ringing of the receive-end videophone). The establishment of such connections can be granted a higher priority in the network than the establishment of broadband connections which are not charged for during broadband connection setup. Broadband resources that are reserved in the network on request will be paid for by the subscribers and used directly.

The invention will be further developed by the features of the dependent claims.

The present invention will now be explained using examples with reference to the accompanying drawings:

BRIEF DESCRIPTION OF THE DRAWINGS

FIG. 1 shows a flowchart for the setup of a broadband connection.

FIG. 2 shows a flowchart for the setup of a multimedia connection.

DETAILED DESCRIPTION OF INVENTION

FIG. 1 shows a flowchart for the setup of a broadband connection according to the invention based on the example of videotelephony and FIG. 2 shows a flowchart for the setup and charging of a broadband connection according to the invention.

In ATM networks, for example, network resources such as transmission capacity on the physical circuits and ATM cell memory in the network nodes are distributed over virtual connections. The resulting flexible and efficient use of network resources is subject to the mutual interference between connections, particularly if the permissible network load is exceeded. Traffic control is based on a Traffic Contract concluded between a subscriber and the network, in which the subscriber, at connection setup, notifies the network of traffic parameters characterizing the required connection and undertakes to adhere to the agreements. In addition to the traffic parameters, the subscriber agrees QoS (Quality of Service) requirements with the network. The network decides whether the connection required by the subscriber can be accepted without impairment to the QoS of existing connections or new connections to be established.

In FIG. 1 shows the setup according to the invention of a multimedia connection from an A-subscriber to a B-subscriber based on a videotelephony example. With the "Setup" message, the A-subscriber A-Tln informs his switch A-Vst that he wants to set up a connection with the B-subscriber B-Tln. The "Setup" message contains the request for a multimedia connection with a 64 kbit data stream for the transmission of audio data and a 2 Mbit data stream for the transmission of video data. The switch A-Vst, however, only transmits a "Setup" message for the establishment of a minimum connection for the 64 kbit audio data stream to the B-subscriber's switch B-Vst. The B-subscriber's switch B-Vst sends the B-subscriber B-Tln a "Setup" message for a 64 kbit audio connection, whereupon the B-subscriber's terminal is busied. If resources are available for the 64 kbit audio connection, in the next step the 64 kbit audio connection is set up and reserved. The B-subscriber B-Tln is called (ringing of the receive-end videophone). If the B-subscriber B-Tln goes off-hook, an "Answer" message is sent from him to the A-subscriber A-Tln via the switches A-Vst and B-Vst. The 64 kbit audio connection between the A-subscriber A-Tln and the B-subscriber is put into operation and charged for. Thereafter the switch A-Vst initiates setup of the 2 Mbit video connection and sends a "Setup" message for the establishment of the 2 Mbit video connection to the B-subscriber's switch B-Vst, whereupon the latter sends the B-subscriber a "Setup" message for the establishment of the 2 Mbit video connection. As soon as the necessary resources for the 2 Mbit video connection have been granted by the network, the connection is put into operation and charging is adapted accordingly. Several attempts may be necessary or permissible depending on circumstances. This allows greater capacity utilization of the network or means that the network requires little or no overdimensioning. A time delay in providing the video connection is acceptable, as communication between the subscribers A-Tln, B-Tln is already possible via the audio connection.

According to the invention, the data to be transmitted even via the minimum connection can be specified in the "Setup" message from the A-subscriber A-Tln to his switch A-Vst. This is advantageous if, prior to transmission of broadband information, initialization data has to be transmitted between the subscribers A-Tln, B-Tln and said information can be transmitted even via the minimum connection.

It is additionally possible for the A-subscriber A-Tln to himself initiate setup of the broadband connection when required, instead of the switch A-Vst of the A-subscriber A-Tln setting it up automatically when the minimum connection is put into operation.

FIG. 2 shows an example of the setup and charging of a multimedia/broadband connection according to the invention. In this example a broadband connection is established from the A-subscriber A-Tln to the B-subscriber B-Tln, without a pre-existing minimum connection. The A-subscriber A-Tln can communicate this requirement to his switch A-Vst in the "Setup" message. The switch A-Vst receives from the A-subscriber in the "Setup" message the request to establish a 2 Mbit multimedia connection and forwards said request in a similar manner to the example shown in FIG. 1. If the resources for setting up the 2 Mbit multimedia connection are available to the network, the 2 Mbit multimedia connection is reserved and charged for. The B-subscriber B-Tln is called. If the B-subscriber B-Tln goes off-hook, an "Answer" message is sent by him to the A-subscriber A-Tln via the switches A-Vst and B-Vst. The 2 Mbit multimedia connection between the A-subscriber A-Tln and the B-subscriber is put into operation. The setup of such connections can be granted a higher priority in the network than the cleardown of minimum connections in favor of full connections or the establishment of broadband connections which are not charged for during the broadband connection setup phase.

The invention claimed is:

1. A communication system for establishing a broadband connection between a plurality of subscribers by switches in a communication network, comprising:

a calling subscriber that sends a plurality of bandwidth requests, the plurality of bandwidth requests having a broadband request;

a switch operatively connected to the calling subscriber that selects a minimum bandwidth, the minimum bandwidth being the smallest bandwidth within the plurality of bandwidth requests;

minimum connection is established between the calling subscriber and the called subscriber using the minimum bandwidth; and a broadband connection for the broadband request is not established until after the called subscriber has answered in the event that the called subscriber is unavailable.

2. A communication system according to claim 1, wherein a data stream determined by the calling subscriber is transmitted via the minimum connection.

3. A communication system according to claim 2, wherein one of the subscribers first initiates the establishment of the minimum connection and thereafter the establishment of the broadband connection.

4. A communication system according to claim 1, wherein one of the subscribers first initiates the establishment of the minimum connection and thereafter the establishment of the broadband connection.

5. A communication system according to claim 4, wherein the calling subscriber is charged as early as the broadband connection setup phase.

6. A communication system according to claim 1, wherein upon receiving a minimum connection answer message the switch is adapted to establish a connection using the plurality of bandwidth requests and excluding the minimum bandwidth request, the connection includes the broadband connection.

7. A communication system according to claim 6, wherein the calling subscriber is charged as early as the broadband connection setup phase.

8. A communication system according to claim 7, wherein the establishment of the broadband connection has a higher priority in the communication network than the establishment of broadband connections which are not charged for during the broadband connection setup phase.

9. A method for establishing a broadband connection between a plurality of subscribers in a communication network, comprising;

receiving a plurality of bandwidth requests from a calling subscriber operatively connected to a switch, the plurality of bandwidth requests having a broadband request;

determining a minimum bandwidth by the switch, the minimum bandwidth being the smallest value within the bandwidth request;

establishing a minimum connection between the calling subscriber and a called subscriber using the minimum bandwidth, a broadband connection for the broadband request is not established until after the called subscriber has answered in the event that the called subscriber is unavailable; and establishing a connection after the called subscriber has answered between the subscribers using the plurality of bandwidth requests and excluding the minimum bandwidth after establishing the minimum connection.

10. A method according to claim 9, wherein a data stream determined by the calling subscriber is transmitted via the minimum connection.

11. A method according to claim 9, wherein the calling subscriber initiates the establishment of a second broadband connection.

12. A method according to claim 9, wherein the calling subscriber is charged as early as the broadband connection setup phase.

13. A method according to claim 10, wherein a calling subscriber first initiates the establishment of a minimum connection and thereafter the establishment of the broadband connection.

14. A method for charging for a broadband connection between a plurality of subscribers in a communication network, comprising:

indicating a high priority broadband connection by the subscriber initiating the connection;

establishing the high priority broadband connection prior to establishing a non-high priority broadband connection; and charging the subscriber requesting the high priority broadband connection during setup of the high priority broadband connection and before the high priority broadband connection has been established.

15. A method according to claim 14, wherein the establishment of the broadband connection has a higher priority in the communication network than the establishment of broadband connections which are not charged for during the broadband connection setup phase.

16. A method for charging for a broadband connection between a calling subscriber and a called subscriber in a communication network, comprising:

indicating a high priority broadband connection by the calling subscriber requesting the connection;

establishing the high priority broadband connection prior to establishing a non-high priority broadband connection; and charging the calling subscriber during setup of the high priority broadband connection so that the calling subscriber is charged from the high priority broadband connection in the event a called subscriber does not answer.

17. A method according to claim 16, wherein the establishment of the broadband connection charged for during the connection setup phase has a higher priority in the network than a broadband connection not charged during the connection setup phase.

* * * * *